United States Patent
Doshi et al.

(10) Patent No.: US 10,536,715 B1
(45) Date of Patent: *Jan. 14, 2020

(54) MOTION ESTIMATION THROUGH THE USE OF ON-CAMERA SENSOR INFORMATION

(71) Applicant: GOPRO, INC., San Mateo, CA (US)

(72) Inventors: Sandeep Doshi, San Mateo, CA (US); Sumit Chawla, San Mateo, CA (US); Adeel Abbas, San Mateo, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/462,323

(22) Filed: Mar. 17, 2017

Related U.S. Application Data

(60) Provisional application No. 62/423,198, filed on Nov. 16, 2016.

(51) Int. Cl.
| H04N 19/167 | (2014.01) |
| H04N 19/56 | (2014.01) |
| H04N 19/543 | (2014.01) |
| H04N 19/107 | (2014.01) |

(52) U.S. Cl.
CPC ........... *H04N 19/56* (2014.11); *H04N 19/107* (2014.11); *H04N 19/167* (2014.11); *H04N 19/543* (2014.11)

(58) Field of Classification Search
CPC .. H04N 19/137; H04N 19/172; H04N 19/182; H04N 19/426; H04N 19/44; H04N 19/46; H04N 19/56; H04N 19/107; H04N 19/167; H04N 19/543; G06T 7/20

USPC ....................................... 375/240.04, 240.08
See application file for complete search history.

(56) References Cited

U.S. PATENT DOCUMENTS

| 6,243,099 B1 | 6/2001 | Oxaal |
| 9,264,598 B1 | 2/2016 | Baldwin |
| 9,609,212 B2 | 3/2017 | Takenaka |
| 2005/0135686 A1 | 6/2005 | Fukushima |
| 2006/0256202 A1 | 11/2006 | Hohenacker |
| 2008/0074500 A1 | 3/2008 | Chen |
| 2009/0010567 A1 | 1/2009 | Akiba |
| 2010/0097444 A1 | 4/2010 | Lablans |
| 2011/0063421 A1 | 3/2011 | Kubota |
| 2011/0115806 A1 | 5/2011 | Rogers |
| 2011/0168475 A1 | 7/2011 | Moser |
| 2011/0249001 A1 | 10/2011 | Kameyama |
| 2011/0255802 A1 | 10/2011 | Kameyama |
| 2013/0013185 A1 | 1/2013 | Smitherman |

(Continued)

*Primary Examiner* — Ayman A Abaza
(74) *Attorney, Agent, or Firm* — Esplin & Associates, PC

(57) ABSTRACT

Systems and methods for utilizing on-camera sensor information to improve video and/or image encoding quality are discussed herein. Specifically, the systems and methods may utilize on-camera sensor information to efficiently determine whether to encode a particular frame within a set of frames as an intra frame. When captured on video, a particular arrangement of a group of pixels within a frame may comprise a visual representation of an object within the frame. When encoding video footage, motion information characterizing motion of an image capturing device over time may be used to predict displacement of an arrangement of group of pixels between frames. These predictions may be used to efficiently determine whether to encode a particular frame as an intra frame.

14 Claims, 4 Drawing Sheets

(56) References Cited

U.S. PATENT DOCUMENTS

| | | |
|---|---|---|
| 2013/0100132 A1 | 4/2013 | Katayama |
| 2014/0010409 A1* | 1/2014 | Yamashita ......... G06K 9/00342 |
| | | 382/103 |
| 2014/0133548 A1 | 5/2014 | Mate |
| 2014/0233801 A1 | 8/2014 | Cho |
| 2014/0347263 A1* | 11/2014 | Dai ........................ G06F 3/017 |
| | | 345/156 |
| 2015/0055821 A1* | 2/2015 | Fotland ................ G06K 9/3241 |
| | | 382/103 |
| 2015/0173715 A1 | 6/2015 | Raghavan |
| 2016/0142705 A1* | 5/2016 | Fan ...................... H04N 19/503 |
| | | 375/240.13 |
| 2016/0165261 A1 | 6/2016 | Nystrom |
| 2018/0063526 A1* | 3/2018 | Choi ................... H04N 19/115 |
| 2018/0088679 A1 | 3/2018 | Dai |

\* cited by examiner

MOTION ESTIMATION THROUGH THE USE OF ON-CAMERA SENSOR INFORMATION

FIELD OF THE INVENTION

The field of the invention relates generally to video encoding systems and methods, and more particularly, to systems and methods for utilizing on-camera sensor information to improve video encoding quality.

BACKGROUND

Image capturing devices, such as cameras, are used to capture photos and videos of individuals, buildings, landscapes, objects, and/or other images within the surroundings of the image capturing device. Oftentimes, image capturing devices may be used to capture videos of an activity or event in which the image capturing device may be moving and/or rotating as the activity or event is being captured. This movement of the image capturing device may present various problems for encoders attempting to generate an encoded video file using the video footage captured by the image capturing device.

When captured on video, a particular arrangement of a group of pixels within a frame may comprise a visual representation of an object within the frame. When encoding video footage, movement of the arrangement of the group of pixels from frame-to-frame may be tracked based on the position and/or particular arrangement of the group of pixels in a previous frame. For example, in a given frame, an arrangement of a group of pixels may be searched for in a fixed area based on the last known position of the arrangement within a previous frame. If located, the knowledge of the arrangement's movement may be used to reduce and/or eliminate temporal redundancy by encoding the frame in terms of the transformation of a previous, reference frame to the frame. However, if movement of the image capturing device results in a failure to locate the arrangement within the fixed search area due to a displacement of the arrangement outside of the fixed search area, the arrangement may not be located within the fixed search area and the entire frame may be searched to locate the arrangement. This process consumes more bandwidth (e.g., DDR bandwidth), power, and time searching for similarities between frames.

These and additional problems exist when attempting to generate an encoded video file using video footage captured by a moving and/or rotating image capturing device.

SUMMARY

This disclosure relates to systems and methods for utilizing on-camera sensor information to improve video encoding quality. The systems and methods may utilize on-camera sensor information to efficiently determine whether to encode a particular frame within a set of frames as an intra frame. As an image capturing device moves and/or rotates while capturing video, an object within the field of view may move within subsequent captured frames. As a result, the arrangement of the group of pixels representing the object may be displaced within subsequent captured frames. This may result in displacement of the arrangement of the group of pixels outside of a fixed search area. Systems and methods described herein may utilize motion information characterizing the motion of the image capturing device when encoding video footage to determine an area within a frame to search with a higher likelihood that an arrangement of a group of pixels will be found within a given frame. As such, a determination as to whether an arrangement of a group of pixels representing the object may be located within a given frame, and in turn whether the frame is to be encoded as an intra frame, may be made without having to sacrifice time and power searching the entire frame.

In various implementations, the system described herein may be configured to utilize on-camera sensor information to improve video encoding quality, in accordance with one or more implementations. The system may include one or more of an interface, one or more physical processors, an electronic storage, an image capturing device, and/or other components. The one or more physical processors may be configured by computer-readable instructions. Executing the computer-readable instructions may cause the one or more physical processors to utilize on-camera sensor information to improve video encoding quality. The computer-readable instructions may include one or more computer program components. The computer program components may include one or more of an object identification component, a motion component, a search identification component, a frame search component, a video or image compression component, and/or other computer program components.

The object identification component may be configured to identify an object within a frame captured by an image capturing device by identifying a particular arrangement of a group of pixels representing the object within the frame and determining a position of the particular arrangement within the frame.

The motion component may be configured to obtain motion information characterizing motion of the image capturing device over time. For example, the motion component may be configured to obtain motion information characterizing motion of the image capturing device between a first time at which a first frame was captured and a second time at which a second frame was captured. As such, the second frame may come after the first frame within a sequence of frames. The first frame and the second frame may be adjacent within the sequence of frames. In some implementations, other frames may separate the first frame and the second frame within the sequence of frames.

The motion information may be generated by one or more motion sensors associated with the image capturing device. As a non-limiting example, the one or more motion sensors may include one or more of an inertial measurement unit, a GPS component, an accelerometer, a gyroscope, an altimeter, a distance measurement sensor, a magnetometer, a magnetic position sensor, a radio-frequency position sensor, and/or other sensors. The motion information may characterize one or more motions. The one or more motions may include one or more of movement of the image capturing device and/or the image sensor(s), change in position of the image capturing device and/or the image sensor(s), and/or other motion of the image capturing device and/or the image sensor(s). The motion information characterizing motion of the image capturing device may include one or more of translational motion, rotational motion, vertical motion, horizontal motion, acceleration motion, deceleration motion, altitudinal motion, and/or other types of motion.

The search identification component may be configured to identify a portion of a frame in which to search for an arrangement of a group of pixels representing an object based on motion information and the position of the arrangement of the group of pixels in a previous frame. As the image capturing device moves and/or rotates while capturing a video, the arrangement of the group of pixels representing the object may be displaced within subsequent captured frames. The search identification component may be configured to identify a search area within a frame in which the arrangement of the group of pixels is predicted to be located based upon movement of the image capturing device and the location of the arrangement within a previous frame. Identifying a portion of a frame as a search area may include determining a location of the portion within the frame and/or identifying one or more dimensions of the portion within the frame. The portion of the frame may be less than the total area of the frame.

The frame search component may be configured to search within a frame and determine whether an arrangement of a group of pixels representing an object is located within a particular frame. For example, the frame search component may be configured to search within a frame and determine whether an arrangement of a group of pixels representing an object is located within all and/or one or more portions of the frame. In some implementations, the frame search component may be configured to only search a portion of the frame. For example, the frame search component may be configured to only search a portion of the frame identified by the search identification component. In some implementations, if an arrangement of a group of pixels is not found within a first portion of a frame, the frame search component may be configured to search one or more additional portions and/or the remainder of the frame.

The video or image compression component may be configured to receive a sequence of frames and generate compressed video and/or image information as an output. For example, the video or image compression component may be configured to encode a frame as an intra frame based on the determination of whether a particular arrangement of a group of pixels representing an object was located by the frame search component. The video or image compression component may be configured to generate compressed video information and/or image information using one or more compression methods. For example, the video or image compression component could utilize HEVC, H.264/AVC, AV1, CineForm, and/or other codec to generate compressed video and/or image information.

In various implementations, the video compression component may be configured to encode a frame as an intra frame if an arrangement of a group of pixels identified in a previous frame was not located within a portion of the frame identified by the search identification component. If the arrangement of the group of pixels identified in the previous frame is located within the portion of the frame identified by the search identification component, the video compression component may be configured to encode the frame as an inter frame. When encoding a frame as an inter frame, the video compression component may be configured to encode the frame by referencing one or more previous frames. The video compression component may be configured to use motion estimation/compensation to encode the video data, such that the second frame may be described in terms of the transformation (e.g., differences) from a first frame to a second frame.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

This disclosure relates to systems and methods for utilizing on-camera sensor information to improve video encoding quality. Specifically, the systems and methods may utilize on-camera sensor information to efficiently determine whether to encode a particular frame within a set of frames as an intra frame, thereby adaptively adjusting an intra frame insertion rate associated with a sequence of frames.

An intra frame insertion rate identifies the frequency of intra frames within a predefined number of frames. An inter frame is encoded by reference to one or more related frames in a set of grouped frames, whereas an intra frame is encoded without reference to one or more related frames and thus contains all of its own information. While intra frames require less processing power than inter frames, intra frames utilize a greater number of bits than inter frames. The intra frame insertion rate for a group of frames may affect various parameters associated with the encoded video file. For example, the intra frame insertion rate may affect the available memory and/or power, the ability to randomly access individual frames, compression efficiency, and/or system latency.

Figure 5A:
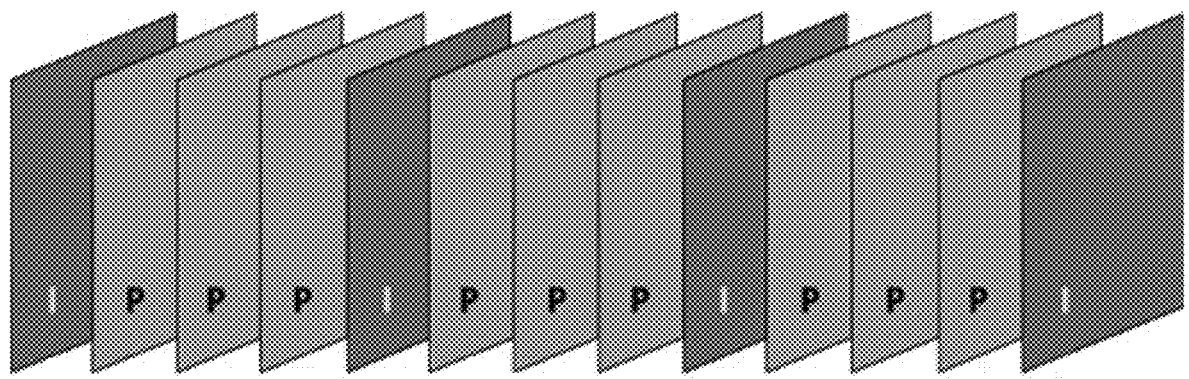
FIGS. 5A-B depict exemplary GOP structures that may be utilized in video encoding.
Figure 5B:
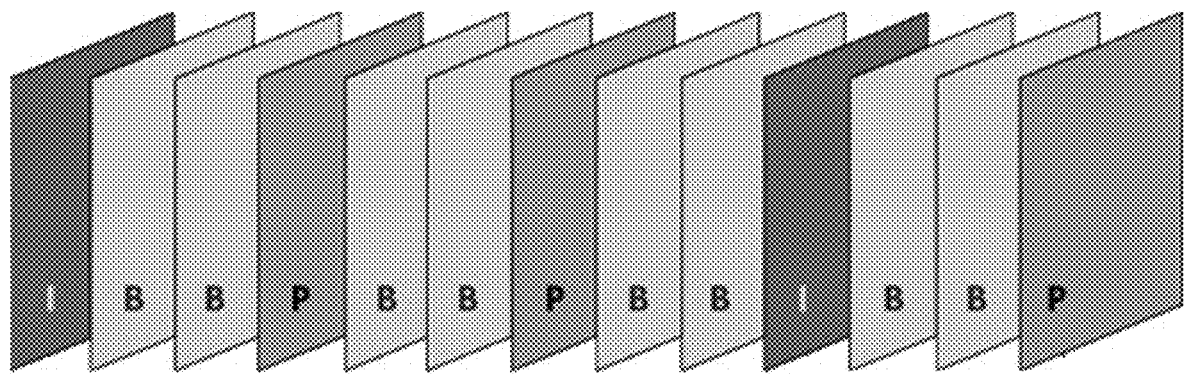

FIG. 5A and FIG. 5B depict exemplary GOP structures that may be utilized in video encoding. A GOP (or "group of pictures") is a group of successive pictures within a coded video stream. A GOP structure may specify the order in which types of frames are arranged within a group of successive pictures. FIG. 5A depicts an example of an IPPP3 GOP structure, wherein three inter frames (or P frames) are located between any two intra frames (or I frames). FIG. 5B depicts an example of an IBBP8 GOP structure, wherein eight frames (i.e., a combination of eight bi-predictive (or B frames) and inter frames) are located between any two intra frames.

Typically, an intra frame insertion rate is predefined and does not change based on the motion of an image capturing device. However, different intra frame insertion rates may better suit different scenes based on the complexity of the scene and/or the movement of the image capturing device while capturing the scene. In various implementations, the systems and methods described herein may utilize motion information characterizing the motion of an image capturing device to efficiently determine whether to encode a particular frame within a set of frames as an intra frame, thereby adaptively adjusting an intra frame insertion rate associated with a sequence of frames to better suit the scene depicted by the sequence of frames.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Exemplary System Architecture

Figure 1:
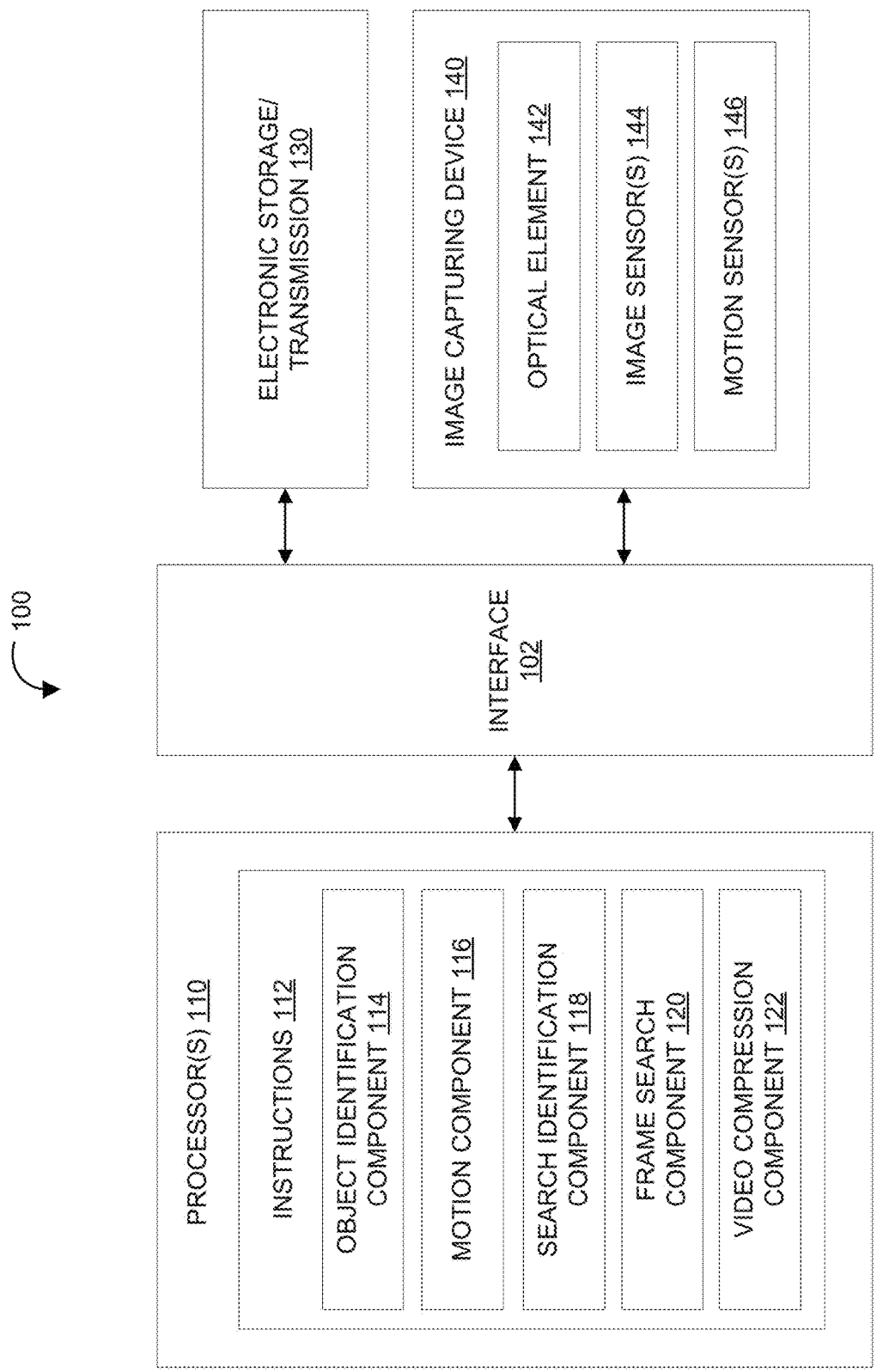
FIG. 1 illustrates a system for utilizing on-camera sensor information to improve video encoding quality, in accordance with one or more implementations.

FIG. 1 illustrates a system 100 for utilizing on-camera sensor information to improve video encoding quality, in accordance with one or more implementations. The system may include one or more of interface 102, one or more physical processors 110, electronic storage/transmission 130, image capturing device 140, and/or other components.

The one or more physical processors 110 (also interchangeably referred to herein as processor(s) 110, processor 110, or processors 110 for convenience) may be configured to provide information processing capabilities in system 100. As such, the processor(s) 110 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor(s) 110 may be configured to execute one or more computer readable instructions 112. Computer readable instructions 112 may include one or more computer program components. Computer readable instructions 112 may include one or more of object identification component 114, motion component 116, search identification component 118, frame search component 120, video compression component 122, and/or other computer program components. As used herein, for convenience, the various computer readable instructions 112 will be described as performing an operation, when, in fact, the various instructions program the processor(s) 110 (and therefore system 100) to perform the operation.

Object identification component 114 may be configured to identify an object within a frame captured by image capturing device 140. Image capturing device 140 may capture visual content including a first frame captured at a first point in time. Visual content may include one or more of an image, a sequence of images, a frame of a video, a video, audio content, and/or other visual content. The video may be composed of many still images, also known as frames. The frames may compose a moving picture, such as the visual content.

The visual content (e.g., the visual content including the first frame captured at the first point in time) may be obtained through use of one or more image sensors 144. In some implementations, the image sensor(s) 144 may be carried (e.g., attached to, supported, held, disposed on, and/or otherwise carried) by an object (e.g., a gimbal). In some implementations, the image sensor(s) 144 may be carried by a vehicle (e.g., a car, a bike, a boat, an airplane, and/or other vehicle). In some implementations, the image sensor(s) 144 may be carried by a remote controlled vehicle (e.g., remote controlled airplane, remote controlled car, remoted controlled submarine, and/or other remote controlled vehicle). In some implementations, the image sensor (s) 144 may be carried by an unmanned aerial vehicle (e.g., drones and/or other unmanned aerial vehicles). In some implementations, the image sensor(s) 144 may be carried by a person. In some implementations, the image sensor(s) 144 may be carried by an animal. Other carryings of the image sensor(s) 144 may be contemplated.

Image capturing device 140, via the one or more image sensors 144, may capture an object within a first frame at a first point in time. The object may include a stationary object or a moving object. Non-limiting examples of an object may include a person, a child, an adult, one or more parts of a person (e.g., arm, hand, head, body, leg, feet, face, and/or other part(s) of a person), an animal, one or more parts of an animal, a vehicle, one or more parts of a vehicle (e.g., wheel, door, engine, trunk, window, wing, propeller, rotor, and/or other part(s) of a vehicle), a tree, a building, a lamppost, a picture, and/or other objects.

Object identification component 114 may be configured to identify an object within a frame captured by image capturing device 140 and determine a position of the object within the frame. When captured on video, a particular arrangement of a group of pixels within a frame may comprise a visual representation of an object within the frame. In various implementations, object identification component 114 may be configured to identify an object within a frame captured by image capturing device 140 by identifying a particular arrangement of a group of pixels representing the object within the frame.

In various implementations, object identification component 114 may be configured to determine a position of the arrangement of pixels within the frame. For example, object identification component 114 may be configured to determine the position of the arrangement of pixels within the first frame at the first point in time at which the first frame was captured by image capturing device 140. The position of the arrangement of pixels within the first frame may be determined to be a region within the first frame. The first frame may include edges, including a top edge, a bottom edge opposite the top edge, a left edge that may be perpendicular to the top edge and the bottom edge, and a right edge opposite the left edge, such that the right edge may be perpendicular to the top edge and the bottom edge. For example, the region may include one or more of the top left region of the first frame, the bottom left region of the first frame, the top right region of the first frame, the bottom right region of the first frame, the center of the first frame, off-center of the first frame (e.g., a slight deviation to the left, right, above, or below the center of the first frame), and or other regions of the first frame. This is meant for illustration purposes only, and is not meant to be a limitation of this disclosure, as other positions and/or regions may be contemplated. The region may include dimensions. The dimensions of the region may be represented by pixels. The position of an arrangement of pixels and/or the region of the position of an arrangement of pixels may be represented by coordinates of a coordinate system, such as a Cartesian coordinate system.

Figure 2:
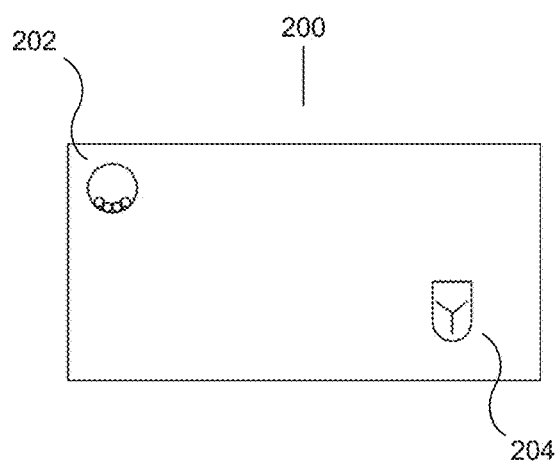
FIG. 2 illustrates a first frame captured by an image capturing device, in accordance with one or more implementations.

For example, and referring to FIG. 2, first frame 200 is depicted. An object represented by arrangement of pixels 202 and an object represented by arrangement of pixels 204 are depicted within first frame 200 captured by an image capturing device (e.g., image capturing device 140) at a first point in time. Object identification component 114 may be configured to identify objects within first frame 200 captured by image capturing device 140. For example, object identification component 114 may be configured to determine that arrangement of pixels 202 comprises an arrangement of a group of pixels representing a first object and that arrangement of pixels 204 comprises an arrangement of a group of pixels representing a second object. Object identification component 114 may be configured to determine a position of one or more arrangements of a group of pixels representing objects captured within first frame 200 by image capturing device 140. For example, object identification component 114 may be configured to determine the position of arrangement of pixels 202 within first frame 200 to be in the top left corner of first frame 200 and determine the position of arrangement of pixels 204 within first frame 200 to be in the bottom right corner of first frame 200.

Returning to FIG. 1, motion component 116 may be configured to obtain motion information characterizing motion of an image capturing device over time. For example, motion component 116 may be configured to obtain motion information characterizing motion of image capturing device 140 between a first time at which a first frame was captured and a second time at which a second frame was captured. The second point in time may come after the first point in time. As such, the second frame may come after the first frame within a sequence of frames. The first frame and the second frame may be adjacent within the sequence of frames. In some implementations, other frames may separate the first frame and the second frame within the sequence of frames.

The motion information may be generated by one or more motion sensors 146 associated with image capturing device 140. As a non-limiting example, one or more motion sensors 146 may include one or more of an inertial measurement unit, a GPS component, an accelerometer, a gyroscope, an altimeter, a distance measurement sensor, a magnetometer, a magnetic position sensor, a radio-frequency position sensor, and/or other sensors. In some implementations, motion component 116 may be configured to obtain motion information from one or more motion sensors located external to image capturing device 140 and/or system 100 and may provide information obtained via the one or more motion sensors external to image capturing device 140 and/or system 100.

The motion information may characterize one or more motions. The one or more motions may include one or more of movement of image capturing device 140 and/or image sensor(s) 144, change in position of image capturing device 140 and/or image sensor(s) 144, and/or other motion of image capturing device 140 and/or image sensor(s) 144. The motion information characterizing motion of image capturing device 140 may include one or more of translational motion, rotational motion, vertical motion, horizontal motion, acceleration motion, deceleration motion, altitudinal motion, and/or other types of motion.

Image capturing device 140 and/or image sensor(s) 144 associated with image capturing device 140 may move for various reasons. The videographer may move image capturing device 140 and/or image sensor(s) 144 to capture one or more objects within a field of view in a slightly different field of view by moving image capturing device 140 in a different direction, by increasing or decreasing the altitude of image capturing device 140, by rotating image capturing device 140, and/or by moving image capturing device 140 in another manner. In various implementations, motion component 116 may be configured to analyze the motion of image capturing device 140 based on the motion information. Image capturing device 140 may be carried by the videographer while the videographer performs an act, such as a skateboard trick, snowboarding while capturing a snowboarder ahead of the videographer, and/or other acts. In various implementations, motion component 116 may be configured to identify an activity being performed during the capture of a sequence of frames based on the motion information.

In an exemplary implementation, motion component 116 may be configured to obtain motion information from one or more motion sensors 146 characterizing a rotational motion of image capturing device 140 between the first point in time at which the first frame may have been captured and a second point in time at which a second frame may be captured. Image capturing device 140 may have moved (e.g., rotated) to the right, left, up, down, or any other direction by a number of degrees represented by a coordinate system, such as a Cartesian coordinate system, a cylindrical and/or polar coordinate system, a spherical and/or polar coordinate system, and/or any other coordinate system. For example, image capturing device 140 may have rotated clockwise by 45-degrees between the first point in time and the second point in time, thus capturing a slightly different field of view within the second frame at the second point in time than within the first frame at the first point in time. Due to movement of image capturing device 140, the position of an object within the field of view of image capturing device 140 may be displaced between the first frame and the second frame. As such, the position of an arrangement of a group of pixels comprising a visual representation of the object within the first frame, captured at the first point in time, may have moved to a different position within the second frame, captured at the second point in time.

Figure 3A:
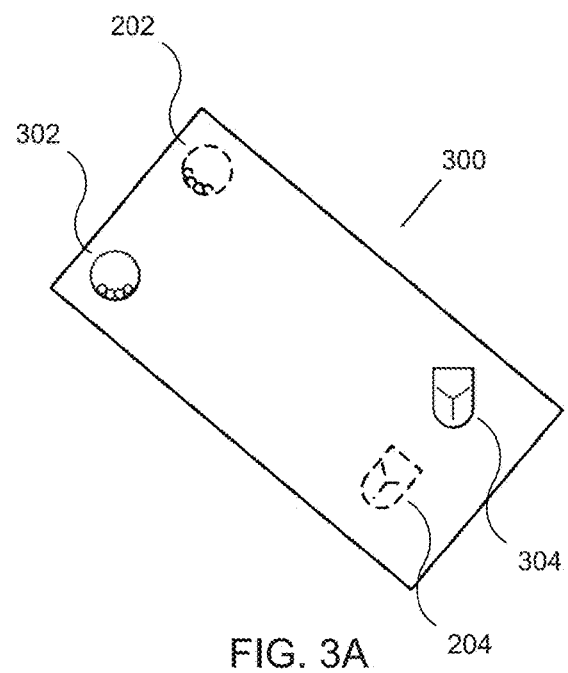
FIGS. 3A-B illustrate a second frame captured by an image capturing device, in accordance with one or more implementations.

Referring to FIG. 3A, second frame 300 is depicted in FIG. 3A. Motion component 116 may be configured to obtain motion information characterizing motion of image capturing device 140 between the first point in time at which first frame 200 was captured and a second point in time at which second frame 300 was captured. Based upon the motion information, motion component 116 may be configured to determine that image capturing device 140 rotated clockwise by 45-degrees, while remaining at the same level or altitude. As such, FIG. 3A is a depiction of second frame 300 captured at the 45-degree clockwise rotation. Based upon the 45-degree clockwise rotation, arrangement of pixels 202 appears to have moved from the top left corner of first frame 200 (as depicted in dashed lines within FIG. 3A) to the bottom left corner of second frame 300 (now depicted by arrangement of pixels 302 in FIG. 3A). Similarly based upon the 45-degree clockwise rotation, arrangement of pixels 204 appears to have moved from the bottom right corner of first frame 200 (as depicted in dashed lines within FIG. 3A) to the top right corner of second frame 300 (now depicted by arrangement of pixels 304 in FIG. 3A).

Referring back to FIG. 1, search identification component 118 may be configured to identify a search area within a frame in which the arrangement of a group of pixels is predicted to be located based upon movement of image capturing device 140 and the location of the arrangement within a previous frame (e.g., the first frame). For example, if system 100 knows the location of an arrangement of pixels representing the object within a first frame, and if system 100 knows that image capturing device 140 has rotated and/or moved in a clockwise direction by a certain number of degrees from the first point in time when it captured the first frame, then the arrangement of pixels, if still within the field of view, should be located at a particular location within the second frame captured at a second point in time.

Identifying the first portion of the second frame as the search area may include determining a location of the first position within the second frame. Identifying the first portion of the second frame as the search area may include identifying one or more dimensions of the location of the first portion within the second frame. The first portion of the second frame may be less than the total area of the second frame. For example, if the frame is 1920 pixels wide and 1080 pixels high, the first portion may be a subset of the total area of the second frame (e.g., 192×108 pixels).

Identifying the first portion of the second frame as the search area may include determining the location of the first portion within the second frame. As discussed above with reference to the location of the arrangement of the group of pixels representing the object within the first frame, the location of the first portion within the second frame may include a region within the second frame. The region may include one or more of the top left region of the second frame, the bottom left region of the second frame, the top right region of the second frame, the bottom right region of the second frame, the center of the second frame, off-center of the second frame (e.g., a slight deviation to the left, right, above, or below the center of the second frame), and or other regions of the second frame. This is meant for illustration purposes only, and is not meant to be a limitation of this disclosure, as other positions and/or regions may be contemplated.

Identifying the first portion of the second frame as the search area may include identifying one or more dimensions of the location of the first portion within the second frame. The search area may include a geometric shape, such as a circle, a rectangle, a square, and/or other geometric shape. The sides of the geometric shape may include dimensions. For example, if the search area is a square, then all four sides of the square may include a dimension of 200 pixels, thus making the search area 400 square pixels.

Figure 3B:
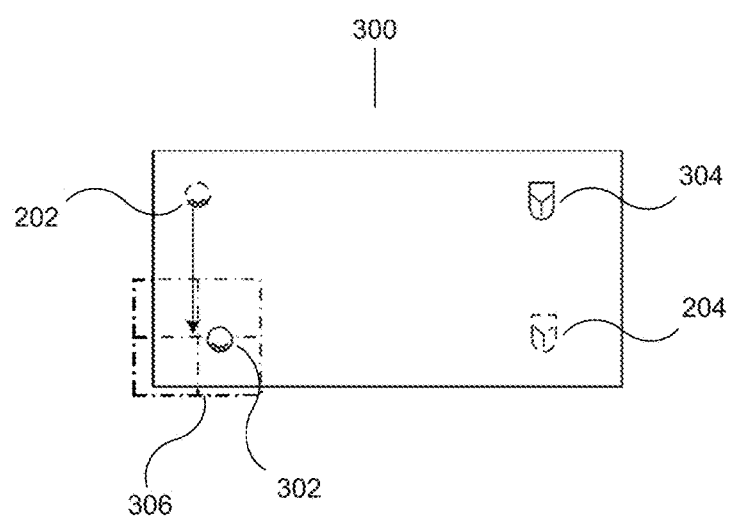

For example, and referring to FIG. 3B, second frame 300 is depicted in FIG. 3B. FIG. 3B depicts second frame 300 without the 45-degree clockwise rotation from FIG. 3A (e.g., similar to first frame 200 from FIG. 2). Search identification component 118 may be configured to identify first portion 306 of second frame 300 as a search area in which to search for arrangement of pixels 300 based upon the motion information and the position of arrangement of pixels 202 within first frame 200. Based upon the motion information (e.g., that image capturing device 140 rotated clockwise by 45 degrees) and the position of arrangement of pixels 202 within first frame 200 (e.g., top left corner of first frame 200), search identification component 118 may be configured to identify that the search area in which to search for arrangement of pixels 302 within second frame 300 should be within the bottom left corner of second frame 300 (e.g., as depicted by first portion 306). Similarly, based upon the motion information (e.g., that image capturing device 140 rotated clockwise by 45 degrees) and the position of arrangement of pixels 204 within first frame 200 (e.g., bottom right corner of first frame 200), search identification component 118 may be configured to identify that the search area in which to search for arrangement of pixels 304 within second frame 300 should be within the top right corner of second frame 300 (not shown).

Referring back to FIG. 1, frame search component 120 may be configured to search within a frame and determine whether an arrangement of a group of pixels representing an object is located within a particular frame. In various implementations, frame search component 120 may be configured to search for an arrangement of pixels within a second frame such that the search for the arrangement of pixels is prioritized within a first portion identified by search identification component 118 with respect to the rest of the second frame. In some implementations, only the first portion of the second frame (e.g., portion 306) may be searched. In some implementations, if the arrangement of pixels is found within the first portion of the second frame, other portions, such as a second portion, of the second frame may not be searched. In some implementations, if the arrangement of pixels is not found within the first portion of the second frame, frame search component 120 may be configured to search one or more additional portions, such as a second portion, of the second frame. For example, the second portion of the second frame may include a portion adjacent to the first portion. The second portion of the second frame may include the rest of the second frame (e.g., the entirety of the second frame minus the first portion). The second portion of the second frame may include a portion of the second frame that is less than the rest of the second frame.

Referring back to FIG. 3B, upon identifying first portion 306 of second frame 300 as a search area in which to search for arrangement of pixels 302, frame search component 120 may be configured to search for arrangement of pixels 302 within second frame 300 such that frame search component 120 prioritizes search for arrangement of pixels 302 within first portion 306 with respect to the rest of second frame 300. Similarly, upon identifying a second portion (not shown, but search identification component 118 may have identified the second portion as the top right corner of second frame 300) of second frame 300 as a search area in which to search for arrangement of pixels 304, frame search component 120 may be configured search for object 304 within second frame 300 such that frame search component 120 prioritizes search for arrangement of pixels 304 within the second portion (not shown) with respect to the rest of second frame 300. In some implementations, if frame search component 120 does not find arrangement of pixels 302 and/or arrangement of pixels 304 within first portion 306 and/or the second portion (not shown), frame search component 120 may be configured to search one or more other portions of second frame 300. The one or more other portions of second frame 300 may include a sub-portion of the remainder of second frame 300 or may include the remainder of second frame 300.

Referring back to FIG. 1, video compression component 122 may be configured receive a sequence of frames and generate compressed video information and/or image information as output. Video compression component 122 may be configured to generate compressed video information resulting in higher overall video quality than with existing motion estimation processes. For example, video compression component 122 may be configured to encode a frame as an intra frame based on the determination of whether a particular arrangement of a group of pixels representing an object was located by frame search component 120. Video compression component 122 may be configured to generate compressed video and/or image information using one or more compression methods. For example, video compression component 122 may utilize HEVC, H.264/AVC, AV1, CineForm, and/or other codec to generate compressed video and/or image information.

In various implementations, video compression component 122 may be configured to encode a frame as an intra frame if an arrangement of a group of pixels identified in a previous frame was not located within a portion of the frame identified by search identification component 118. If the arrangement of the group of pixels identified in the previous frame is located within the portion of the frame identified by search identification component 118, video compression component 122 may be configured to encode the frame as an inter frame. When encoding a frame as an inter frame, video compression component 122 may be configured to encode the frame by referencing one or more previous frames.

Video compression component 122 may be configured to use motion estimation/compensation to encode the video data, such that the second frame may be described in terms of the transformation (e.g., differences) from a first frame to a second frame.

Video compression component 122 may be configured to generate compressed video information resulting in higher overall video quality than with existing motion estimation processes. If the entire second frame is searched for the arrangement of pixels because the arrangement of pixels was not located within a pre-defined search range, encoders may be forced to spend more computational power (e.g., encoders may spend more bits) replacing blocks within the second frame with Intra-blocks. If there is a lot of movement within frames, encoders may be forced to go into bit preservation mode because limits may exist for constant or near-constant bit rate videos. This may result in an overall degraded video quality. With the improved search process disclosed herein, video compression component 122 may be configured to find a matching block faster than traditional block-matching because system 100 may identify the search area within the second frame with a higher likelihood of finding the arrangement of pixels within the search area by accounting for camera movement. As such, video compression component 122 may be configured to generate higher overall video quality because searching for the arrangement of pixels within the first portion of the second frame may consume less power.

Electronic storage/transmission 130 may include electronic storage media that electronically stores and/or transmits information. The electronic storage media of electronic storage/transmission 130 may be provided integrally (i.e., substantially non-removable) with one or more components of system 100 and/or removable storage that is connectable to one or more components of system 100 via, for example, a port (e.g., a USB port, a Firewire port, and/or other port) or a drive (e.g., a disk drive and/or other drive). Electronic storage/transmission 130 may include one or more of optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EPROM, EEPROM, RAM, and/or other electrical charge-based storage media), solid-state storage media (e.g., flash drive and/or other solid-state storage media), and/or other electronically readable storage media. Electronic storage/transmission 130 may be a separate component within system 100, or electronic storage/transmission 130 may be provided integrally with one or more other components of system 100 (e.g., processor 110). Although electronic storage/transmission 130 is shown in FIG. 1 as a single entity, this is for illustrative purposes only. In some implementations, electronic storage/transmission 130 may comprise a plurality of storage units. These storage units may be physically located within the same device, or electronic storage/transmission 130 may represent storage functionality of a plurality of devices operating in coordination Electronic storage/transmission 130 may store software algorithms, information determined by processor 110, information received remotely, and/or other information that enables system 100 to function properly. For example, electronic storage/transmission 130 may store information relating to an object, the position of an arrangement of a group of pixels within a first frame, motion information characterizing motion of an image capturing device, a first portion of a second frame to search for the object, and/or other information.

Image capturing device 140 may comprise one or more of a computing platform, a mobile device (e.g., a smart phone, a tablet, and/or other mobile device), a camera (e.g., an action camera, a sports camera, and/or other type of camera), a video recorder, and/or other device configured to capture images and/or video segments. Image capturing device 140 may capture visual content including the first frame captured at the first point in time. Users may capture visual content using image capturing device 140. Image capturing device 140 may include one or more of optical element 142, one or more image sensor(s) 144, one or more motion sensors 146, and/or other components. In various implementations, processor(s) 110 may be located within image capturing device 140.

Optical element 142 may be configured to guide light to an image sensor (e.g., one or more image sensor(s) 144). Optical element 142 may include one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical elements. Optical element 142 may guide light received from an object within the field of view of an image sensor (e.g., one or more image sensor(s) 144) directly, or indirectly through use of one or more light manipulating components. For example, a light manipulating component may include one or more of a mirror, a prism, lenses, and/or other light manipulating components.

One or more image sensor(s) 144 (also interchangeably referred to herein as image sensor(s) 144, image sensor 144, or image sensors 144 for convenience) may be configured to generate a first output signal conveying visual information present in the light guided thereto by optical element 142 within the field of view of one or more image sensor(s) 144. One or more image sensor(s) 144 may include one or more of a charge-coupled device sensor, an active pixel sensor, a complementary metal-oxide semiconductor sensor, an N-type metal-oxide-semiconductor sensor, and/or other image sensors. Visual information may include content within the field of view of one or more image sensor(s) 144, such as one or more objects within the field of view of one or more image sensor(s) 144, a landscape within the field of view of one or more image sensor(s) 144, and/or other content within the field of view of one or more image sensor(s) 144. An image and/or video segment captured by the image capturing device may include visual information and other information, including audio information.

One or more motion sensors 146 (also interchangeably referred to herein as motion sensor(s) 110, motion sensor 146, or motion sensors 146 for convenience) may be configured to generate motion information characterizing motion of the image capturing device over time. As described further above, one or more motion sensors 146 may generate motion information characterizing motion of the image capturing device between a first time at which a first frame was captured and a second time at which a second frame was captured.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 110, electronic storage/transmission 130, and image capturing device 140 are shown to be connected to interface 102 in FIG. 1, any communication medium may be used to facilitate interaction between any components of system 100. One or more components of system 100 may communicate with each other through hard-wired communication, wireless communication, or both. For example, one or more components of system 100 may communicate with each other through a network. For example, processor 110 may wirelessly communicate with electronic storage/transmission 130. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 110 is illustrated in FIG. 1 as a single component, this is for illustrative purposes only. In some implementations, processor 110 may comprise a plurality of processing units. These processing units may be physically located within the same device, or processor 110 may represent processing functionality of a plurality of devices operating in coordination. Processor 110 may be configured to execute one or more components by software; hardware; firmware; some combination of software, hardware, and/or firmware; and/or other mechanisms for configuring processing capabilities on processor 110.

Furthermore, it should be appreciated that although the various instructions are illustrated in FIG. 1 as being co-located within a single processing unit, in implementations in processor(s) 110 include multiple processing units, one or more instructions may be executed remotely from the other instructions.

The description of the functionality provided by the different computer-readable instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 110 may be programmed by one or more additional instructions that may perform some or all of the functionality attributed herein to one of the computer-readable instructions.

Exemplary Flowchart of Process

Figure 4:
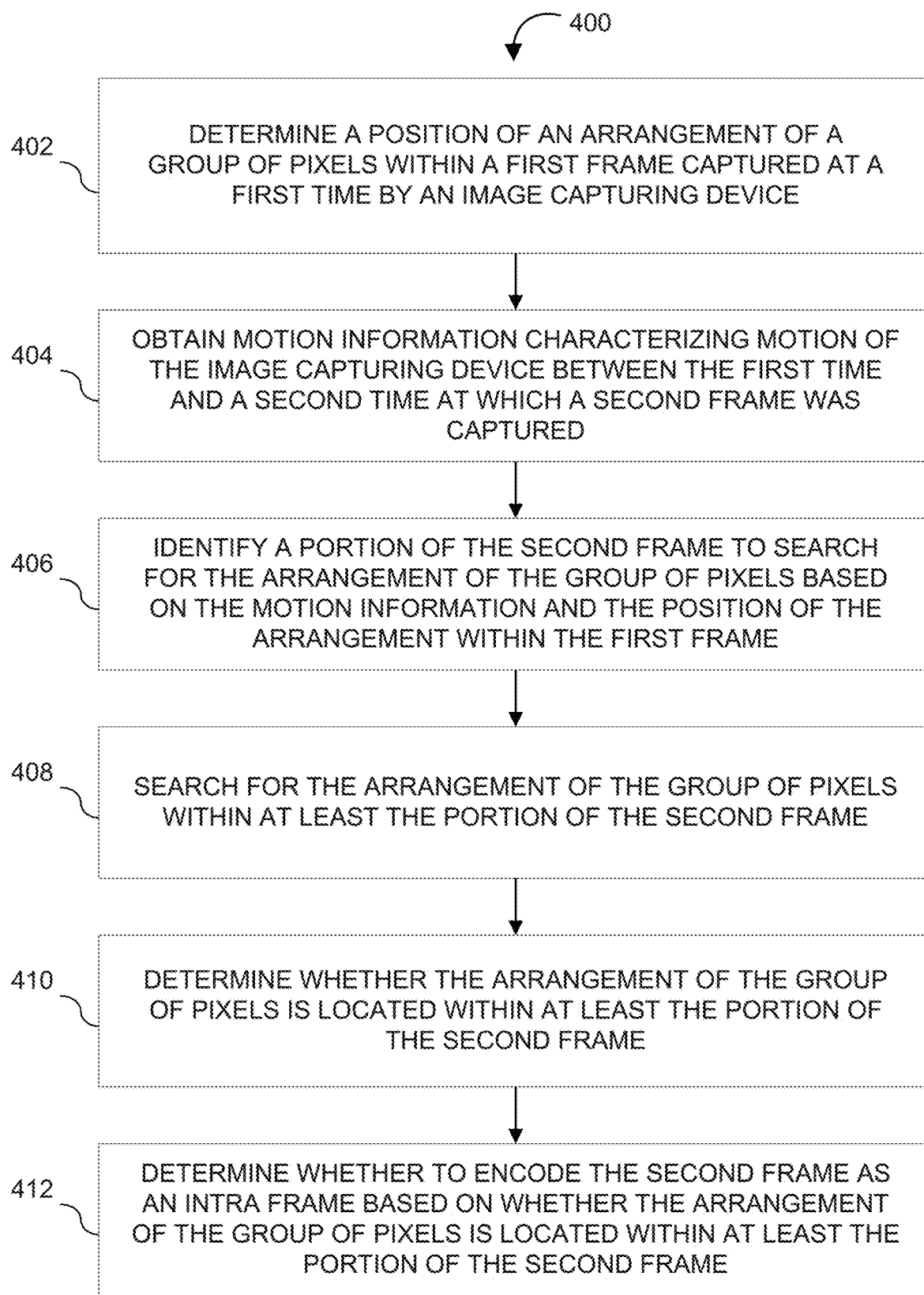
FIG. 4 illustrates a method for utilizing sensor information to improve motion estimation in video encoding, in accordance with one or more implementations.

FIG. 4 illustrates a method 400 for utilizing sensor information to improve motion estimation in video encoding, in accordance with one or more implementations. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 400 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 400 in response to instructions stored electronically on one or more electronic storage mediums. The one or more processing devices may include one or more devices configured through hardware, firmware, and/or software to be specifically designed for execution of one or more of the operations of method 400.

In an operation 402, method 400 may include determining a position of an arrangement of a group of pixels within a first frame captured by an image capturing device. The first frame may have been captured at a first time by an image capturing device. The arrangement of the group of pixels may comprise a visual representation of an object captured by the video capturing device. In some implementations, operation 402 may be performed by a processor component the same as or similar to object identification component 114 (shown in FIG. 1 and described herein).

In an operation 404, method 400 may include obtaining motion information characterizing motion of the image capturing device. The motion information may characterize motion of the image capturing device between the first time at which the first frame was captured and a second time at which a second frame was captured. The motion information may be generated and/or obtained from one or more motion sensors associated with the image capturing device. In some implementations, operation 404 may be performed by a processor component the same as or similar to motion component 116 (shown in FIG. 1 and described herein).

In an operation 406, method 400 may include identifying a portion of the second frame as a search area in which to search for the arrangement of the group of pixels. The portion of the second frame may be identified based on the motion, rotation, and/or altitude information and the position of the arrangement of the group of pixels within the first frame. In some implementations, operation 406 may be performed by a processor component the same as or similar to search identification component 118 (shown in FIG. 1 and described herein).

In an operation 408, method 400 may include searching for the arrangement of the group of pixels within at least the portion of the second frame. In some implementations, operation 408 may be performed by a processor component the same as or similar to frame search component 120 (shown in FIG. 1 and described herein).

In an operation 410, method 400 may include determining whether the arrangement of the group of pixels is located within at least the portion of the second frame. In some implementations, operation 410 may be performed by a processor component the same as or similar to frame search component 120 (shown in FIG. 1 and described herein).

In an operation 412, method 400 may include determining whether to encode the second frame as an intra frame based on whether the arrangement of the group of pixels is located within the portion of the second frame. Responsive to a determination that the arrangement of the group of pixels is not located within at least the portion of the second frame, the second frame may be encoded as an intra frame. Responsive to a determination that the arrangement of the group of pixels is located within at least the portion of the second frame, the second frame may be encoded as an inter frame. In some implementations, operation 412 may be performed by a processor component the same as or similar to video compression component 122 (shown in FIG. 1 and described herein).

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, and/or other components) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system that utilizes sensor information to improve motion estimation in video and/or image encoding, the system comprising:
   one or more physical computer processors configured by computer readable instructions to:
      obtain video information related to video content, the video content comprising a plurality of frames captured in a sequence by an image capturing device, wherein the plurality of frames comprises a sequence of frames comprising at least a first frame captured at a first time and a second frame captured at a second time;
      determine an initial region of the first frame within which a visual representation of an object is located within the first frame, the initial region comprising less than a total area of the first frame;
      obtain motion information characterizing motion of the image capturing device between the first time and the second time, wherein the motion information is generated by one or more motion sensors associated with the image capturing device;
      identify a different region of the second frame as a search area in which to search for the visual representation of the object within the second frame based on the motion of the image capturing device between the first time and the second time and the initial region of the visual representation of the object within the first frame, wherein the different region comprises less than a total area of the second frame, and wherein identification of the different region includes determination of a change in spatial areas of the first frame and the second frame within which the visual representation of the object is located from the initial region of the first frame to the different region of the second frame based on the motion of the image capturing device between the first time and the second time;
      search for the visual representation of the object within the different region of the second frame;
      responsive to a determination that the visual representation of the object is located within the different region of the second frame, encode the second frame as an inter frame; and
      responsive to a determination that the visual representation of the object is not located within the different region of the second frame, encode the second frame as an intra frame;
      wherein encoding of the second frame as the inter frame or the intra frame based on the determination of whether or not the visual representation of the object is located within the different region of the second frame enables encoding of the second frame without analysis of entirety of the second frame.

2. The system of claim 1, wherein the first frame and the second frame are adjacent frames within the plurality of frames.

3. The system of claim 1, wherein the one or more motion sensors include one or more of an inertial measurement unit, a GPS component, an accelerometer, a gyroscope, an altimeter, and/or a distance measurement sensor.

4. The system of claim 1, wherein the motion information characterizing motion of the image capturing device includes one or more of zoom, translational motion, rotational motion, vertical motion, horizontal motion, acceleration motion, and/or deceleration motion.

5. The system of claim 1, wherein identifying the different region of the second frame as the search area includes determining a location of the different region within the second frame.

6. The system of claim 1, wherein identifying the different region of the second frame as the search area includes identifying one or more dimensions of the different region within the second frame.

7. The system of claim 1, wherein encoding the second frame as the inter frame comprises encoding the second frame by referencing one or more previous frames within the sequence of frames.

8. A method of utilizing sensor information to improve motion estimation in video and/or image encoding, the method comprising:
   obtaining video information related to video content, the video content comprising a plurality of frames captured in a sequence by an image capturing device, wherein the plurality of frames comprises a sequence of frames comprising at least a first frame captured at a first time and a second frame captured at a second time;

determining an initial region of the first frame within which a visual representation of an object is located within the first frame, the initial region comprising less than a total area of the first frame;

obtaining motion information characterizing motion of the image capturing device between the first time and the second time, wherein the motion information is generated by one or more motion sensors associated with the image capturing device;

identifying a different region of the second frame as a search area in which to search for the visual representation of the object within the second frame based on the motion of the image capturing device between the first time and the second time and the initial region of the visual representation of the object within the first frame, wherein the different region comprises less than a total area of the second frame, and wherein identification of the different region includes determination of a change in spatial areas of the first frame and the second frame within which the visual representation of the object is located from the initial region of the first frame to the different region of the second frame based on the motion of the image capturing device between the first time and the second time;

searching for the visual representation of the object within the different region of the second frame;

responsive to a determination that the visual representation of the object is located within the different region of the second frame, encoding the second frame as an inter frame; and responsive to a determination that the visual representation of the object is not located within the different region of the second frame, encoding the second frame as an intra frame;

wherein encoding of the second frame as the inter frame or the intra frame based on the determination of whether or not the visual representation of the object is located within the different region of the second frame enables encoding of the second frame without analysis of entirety of the second frame.

9. The method of claim 8, wherein the first frame and the second frame are adjacent frames within the plurality of frames.

10. The method of claim 8, wherein the one or more motion sensors include one or more of an inertial measurement unit, a GPS component, an accelerometer, a gyroscope, an altimeter, and/or a distance measurement sensor.

11. The method of claim 8, wherein the motion information characterizing motion of the image capturing device includes one or more of zoom, translational motion, rotational motion, vertical motion, horizontal motion, acceleration motion, and/or deceleration motion.

12. The method of claim 8, wherein identifying the different region of the second frame as the search area includes determining a location of the different region within the second frame.

13. The method of claim 8, wherein identifying the different region of the second frame as the search area includes identifying one or more dimensions of the different region within the second frame.

14. The method of claim 8, wherein encoding the second frame as the inter frame comprises encoding the second frame by referencing one or more previous frames within the sequence of frames.

* * * * *